UNITED STATES PATENT OFFICE.

HAROLD W. HATHAWAY, OF BOSTON, MASSACHUSETTS.

FIREPROOF COMPOSITION FOR BUILDING PURPOSES.

SPECIFICATION forming part of Letters Patent No. 644,821, dated March 6, 1900.

Application filed June 10, 1898. Serial No. 683,095. (No specimens.)

*To all whom it may concern:*

Be it known that I, HAROLD W. HATHAWAY, of Boston, county of Suffolk, State of Massachusetts, have invented an Improvement in Fireproof Composition for Building Construction, &c., of which the following description is a specification.

In the construction of fireproof buildings it is now usual to fill in the space between the ceiling and the floor above with some material which will protect the beams and girders in the event of fire and which by its incombustibility will retard or altogether prevent the spread of fire. It is also desirable to use some material in the construction of the walls which will not crumble or disintegrate under the influence of great heat. In the course of my experiments to produce a material having the required characteristics and which in its cost of production shall be so low as to bring it within reach of the general public I have discovered a composition which may be used in various forms to accomplish the desired ends.

In accordance therewith my invention consists in a fireproof composition for building construction, &c., composed of finely-divided coal-ash as a base and a liquid silicate of soda incorporated therewith as a binder, with fluor-spar as a setting agent, substantially as will be described.

In carrying out my invention I take coal-ashes, sift them well, and preferably bolt them to reduce to a very light fine powder. To about six parts, by bulk, of the finely-divided coal-ash I add about one part, by bulk, of a suitable binder, preferably silicate of soda in the form known commercially as "water-glass," thoroughly mixing the base and binder together until they are well incorporated. The composition so made may be molded into desired shapes or it may be used between or applied directly to the beams or girders of a building. It can also be applied with a trowel to walls or ceilings in the same manner as and as a substitute for ordinary plaster.

Inasmuch as the coal-ash and binder composition sets somewhat slowly, attended by slight shrinkage, it is desirable for many purposes to incorporate a setting agent therewith to quickly set the mixture and so avoid the shrinkage. A small percentage of fluor-spar may be used as the setting agent, about one-fourth of one part, by bulk, being usually sufficient.

The composition when dry is hard and has a fine or close grain, thoroughly fireproof under all circumstances, and it is much lighter in weight than natural stone or the Portland-cement mixtures.

When raised to a very high temperature and suddenly subjected to the action of cold water, the composition will not crack or disintegrate, nor will it crumble when subjected to high temperature alone.

A pigment or coloring-matter can be mixed with the composition to give it any desired color, the natural color being a neutral gray.

The composition is somewhat absorbent of moisture up to a certain point; but by increasing the proportion of the binder or adding oil or other waterproofing material the composition may be made moisture-proof and used for external construction.

My fireproof material may also be used for the purpose of fireproofing metallic girders or beams by substantially inclosing the same in the composition. When so used, I have found it advisable to add to the composition about one-eighth of one part of powdered oxid or peroxid of manganese, which forms, with the silicate of soda, a species of cement which causes the composition to adhere closely and firmly to the metallic beam or girder, and if the composition is to be applied as a plastering to metallic lathing the addition of the manganese is advisable.

While I have herein described the proportions of the various ingredients entering into the composition which will give good results, I do not restrict myself thereto, for the proportions may be varied according to circumstances without departing from the spirit and scope of my invention.

The composition may also be used for lining the fire-pots of stoves, furnaces, &c., or in other places where a lining having a very high resistance to heat is required.

Having fully described my invention, what

I claim, and desire to secure by Letters Patent, is—

The herein-described fireproof composition of matter, consisting of coal-ashes, liquid silicate of soda as a binder, and fluor-spar as a setting agent, substantially as described.

In testimony whereof I have signed my name to this specification in the presence of two subscribing witnesses.

HAROLD W. HATHAWAY.

Witnesses:
 JOHN C. EDWARDS,
 AUGUSTA E. DEAN.